(12) United States Patent
Baker et al.

(10) Patent No.: US 10,021,647 B2
(45) Date of Patent: *Jul. 10, 2018

(54) METHOD FOR TRANSMITTING DATA IN A NETWORK

(71) Applicant: KONINKLIJKE PHILIPS N.V., Eindhoven (NL)

(72) Inventors: Matthew P J Baker, Canterbury (GB); Timothy J. Moulsley, Caterham (GB); Olivier Jean-Michel Hus, Redhill (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,632

(22) Filed: Mar. 3, 2017

(65) Prior Publication Data
US 2017/0181089 A1 Jun. 22, 2017

Related U.S. Application Data

(63) Continuation of application No. 14/504,459, filed on Oct. 2, 2014, now Pat. No. 9,615,330, which is a
(Continued)

(30) Foreign Application Priority Data

Sep. 28, 2007 (EP) ..................... 07301418
Oct. 26, 2007 (EP) ..................... 07301501

(51) Int. Cl.
*G08C 17/00* (2006.01)
*H04W 52/02* (2009.01)
(Continued)

(52) U.S. Cl.
CPC ... *H04W 52/0229* (2013.01); *H04W 72/0446* (2013.01); *H04W 76/048* (2013.01); *H04W 76/28* (2018.02); *H04W 88/02* (2013.01)

(58) Field of Classification Search
CPC ......... H04W 52/0229; H04W 72/0446; H04W 76/048; H04W 88/02
See application file for complete search history.

(56) References Cited

U.S. PATENT DOCUMENTS

2006/0067241 A1  3/2006 Lorentzen et al.
2007/0298822 A1  12/2007 Wan et al.
(Continued)

FOREIGN PATENT DOCUMENTS

JP  2007068011 A  3/2007
JP  2007243405 A  9/2007
(Continued)

OTHER PUBLICATIONS

LG Electronics, "Transmission of LTE Paging", 3GPP TSG-RAN WG2 Meeting #58 (R2-709126), K08e, Japan, May 7-11, 2007, 3 Pages.
(Continued)

*Primary Examiner* — Wayne H Cai

(57) ABSTRACT

A method for transmitting data from a primary station to a secondary station, includes at the primary station signaling to the secondary station that a data message is to be received, and at the primary station transmitting the data message. The time of transmission of the data message relative to the time of the signaling depends on a state of the secondary station.

34 Claims, 3 Drawing Sheets

Related U.S. Application Data continuation of application No. 12/679,499, filed as application No. PCT/IB2008/053888 on Sep. 24, 2008, now Pat. No. 8,879,456.

(51) Int. Cl.
  *H04W 72/04* (2009.01)
  *H04W 76/04* (2009.01)
  *H04W 76/28* (2018.01)
  *H04W 88/02* (2009.01)

(56) References Cited

U.S. PATENT DOCUMENTS

| | | |
|---|---|---|
| 2008/0080465 A1 | 4/2008 | Pajukoski et al. |
| 2009/0154592 A1 | 6/2009 | Motegi et al. |
| 2015/0257107 A1 | 9/2015 | Chun et al. |

FOREIGN PATENT DOCUMENTS

| | | |
|---|---|---|
| JP | 2009512391 A | 3/2009 |
| JP | 2010515334 A | 5/2010 |
| WO | 2007052917 A1 | 5/2007 |

OTHER PUBLICATIONS

Huawei, "M8SFN Impact on Paging Transmission", 3GPP TSG-RAN WG1 Meeting #49815 (R1-072894), Orlando, FL, Jun. 2007, 2 Pages.

Philips et al, "PDSCH Timing for Power Saving With Paging", 3GPP TSG-RAN WG2 Meeting #5981S (R2-0743362), Shanghai, China, Oct. 2007, 2 Pages.

Nokia, "Active Mode DRX Details", 3GPP TSG-RAN WGX Meeting #55, R2-062753, Seoul, Korea, Oct. 9-13, 2006, pp. 1-10.

METHOD FOR TRANSMITTING DATA IN A NETWORK

This application is a continuation of prior U.S. patent application Ser. No. 14/504,459, filed Oct. 2, 2014 which is a continuation of prior U.S. patent application Ser. No. 12/679,499, filed Mar. 23, 2010, now U.S. Pat. No. 8,879,456, issued Nov. 4, 2014, which is a National Stage Application of PCT/IB2008/053888, filed Sep. 24, 2008, and which claims the benefit of European Patent Application No. 07301418.5, filed Sep. 28, 2007, and European Patent Application No. 07301501.8, filed Oct. 26, 2007, the entire contents of each of which are incorporated herein by reference thereto.

The present invention relates to a method for transmitting data from a primary station to a secondary station, and to the radio stations associated.

This invention is, for example, relevant for mobile communication systems such as UMTS (Universal Mobile Telecommunication System) or for other communication systems.

In a conventional mobile telecommunication system, like UMTS, the primary station like a base station (or NodeB) and the secondary stations, like the mobile stations communicate together by means of a plurality of channels. Mainly, when the primary station wishes to transmit data to a secondary station, the primary station signals to the considered secondary station that data will be transmitted, and in which block of physical resource this data has been allocated. A block of physical resource can be a time slot, and/or a frequency subcarrier, and/or a code.

Figure 1:
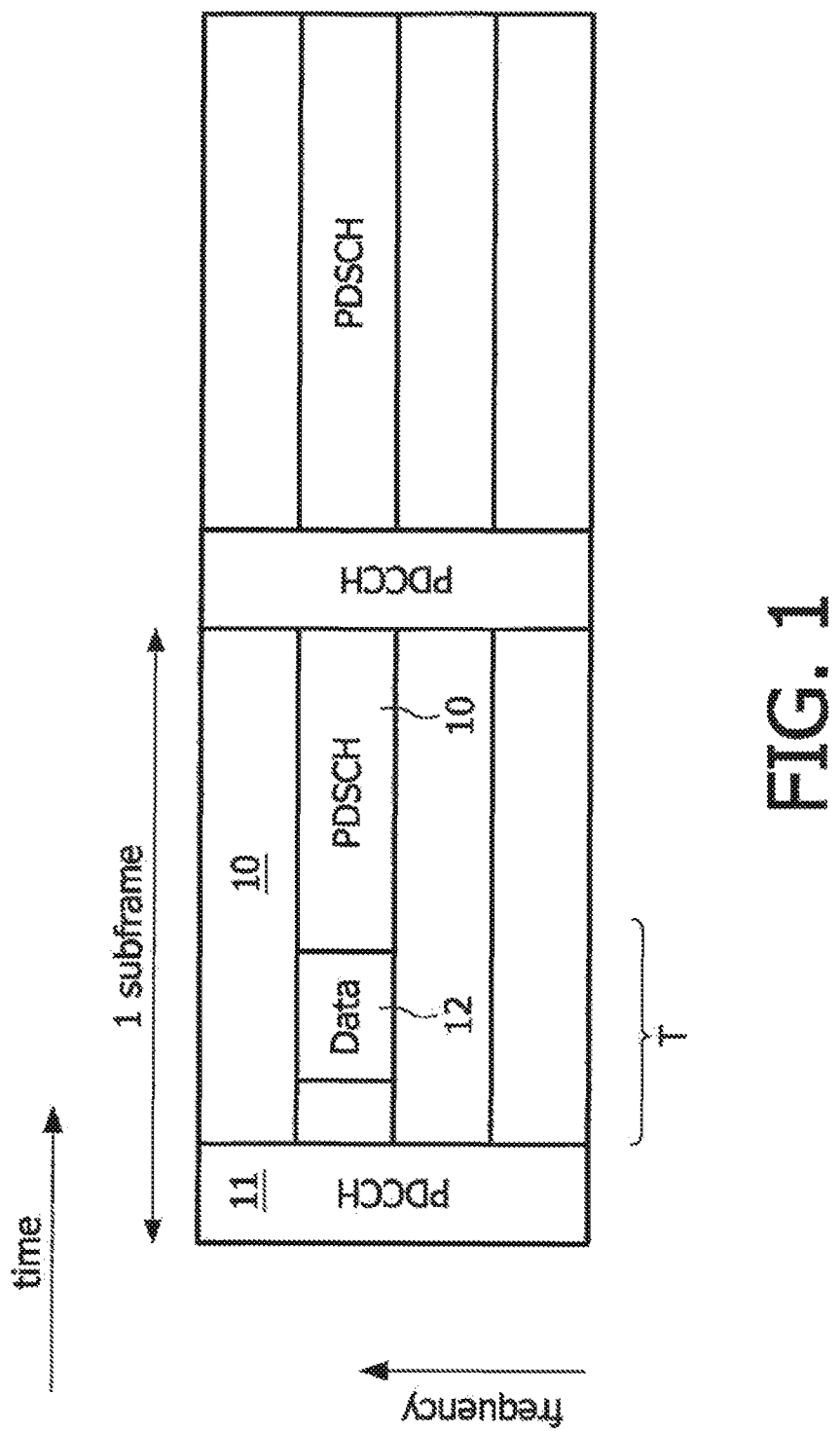

In the UMTS Long Term Evolution (LTE), the downlink data can be transmitted on the Physical Downlink Shared Channels 10 (PDSCHs), illustrated on FIG. 1. Downlink time-frequency resources 12 containing a data transmission for a secondary station on the PDSCH are signaled by a signaling message on a control channel 11 (PDCCH—Physical Downlink Control Channel) transmitted immediately before the PDSCHs 10.

Consequently, each secondary station needs to buffer all the PDSCHs 10 across the full system bandwidth until it has decoded the PDCCH 11, in case there is some data for it on one of the PDSCHs 10. This is represented on FIG. 1 by interval T. As a consequence, each secondary station needs to keep its receiver switched on while it decodes the control channel PDCCH 11. This leads to an energy consumption and thus reduces the battery life of the secondary stations.

While this may not be a significant problem when continuous or high-rate data is being transmitted to a secondary station, it can result in significant unnecessary energy usage when the secondary station is not receiving data frequently, since it has to receive data that may be useless during the interval T in each subframe.

It is an object of the invention to propose a method for reducing the energy consumption of the secondary station.

It is another object of the invention to permit to the secondary station to enter a state of Discontinuous Reception (DRX), where the receiver is switched off and on regularly.

Still another object of the invention is to enable a secondary station to switch off its receiver while it is decoding the signaling message.

To this end, according to a first aspect of the invention, a method is proposed for transmitting data from a primary station to a secondary station, comprising at the primary station signaling to the secondary station by means of a signaling message that a data message is to be received, and at the primary station transmitting the data message, wherein the time of transmission of the data message relative to the time of the signaling message depends on a state of the secondary station.

As a consequence, if a secondary station is currently in a discontinuous reception state for instance, a delay can be configured so that no data for this secondary station is transmitted immediately after the signaling message, and the secondary station can switch off its receiver while it decodes the signaling message. Thus, it permits to reduce the power consumption of secondary stations that are not in a reception state.

Moreover, for secondary stations in a reception state, i.e. secondary stations in a continuous reception state and that may be receiving data in for instance every subframe, data corresponding to them would preferably be immediately after the signaling message.

The present invention also relates to a secondary station comprising means for carrying out the method in accordance with the invention.

The present invention also relates to a primary station comprising means for carrying out the method in accordance with the invention.

These and other aspects of the invention will be apparent from and will be elucidated with reference to the embodiments described hereinafter.

Figure 2:
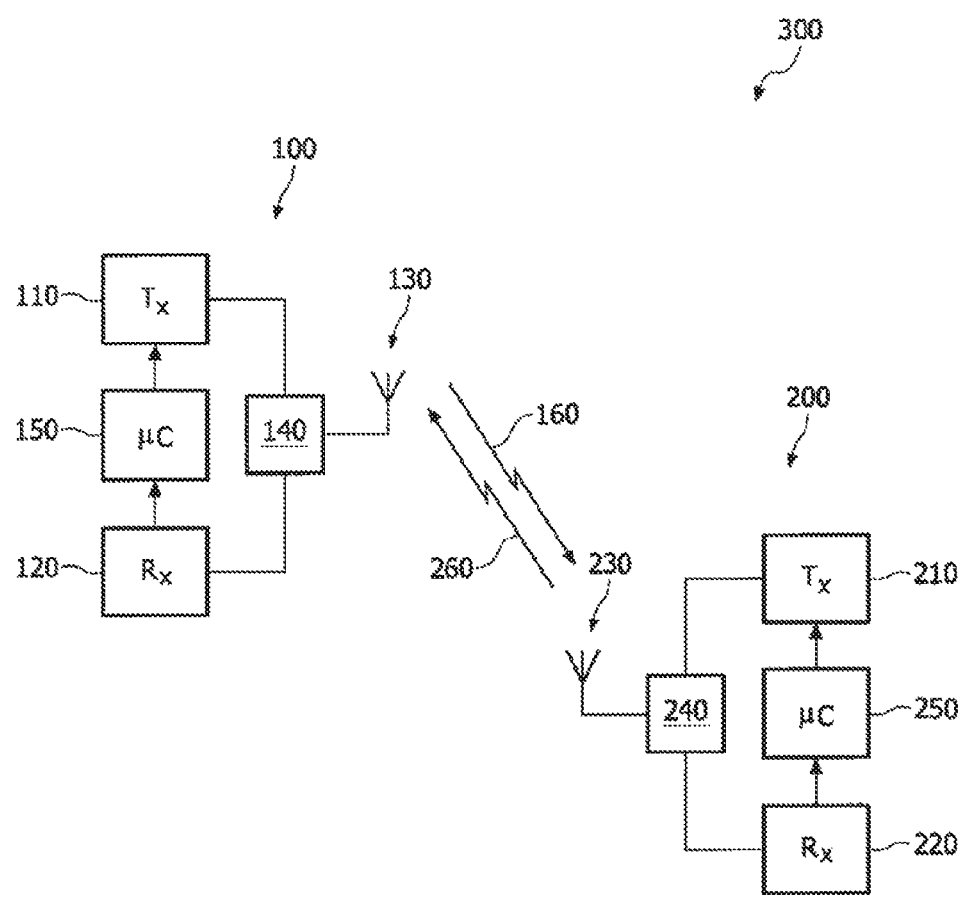
Figure 3:
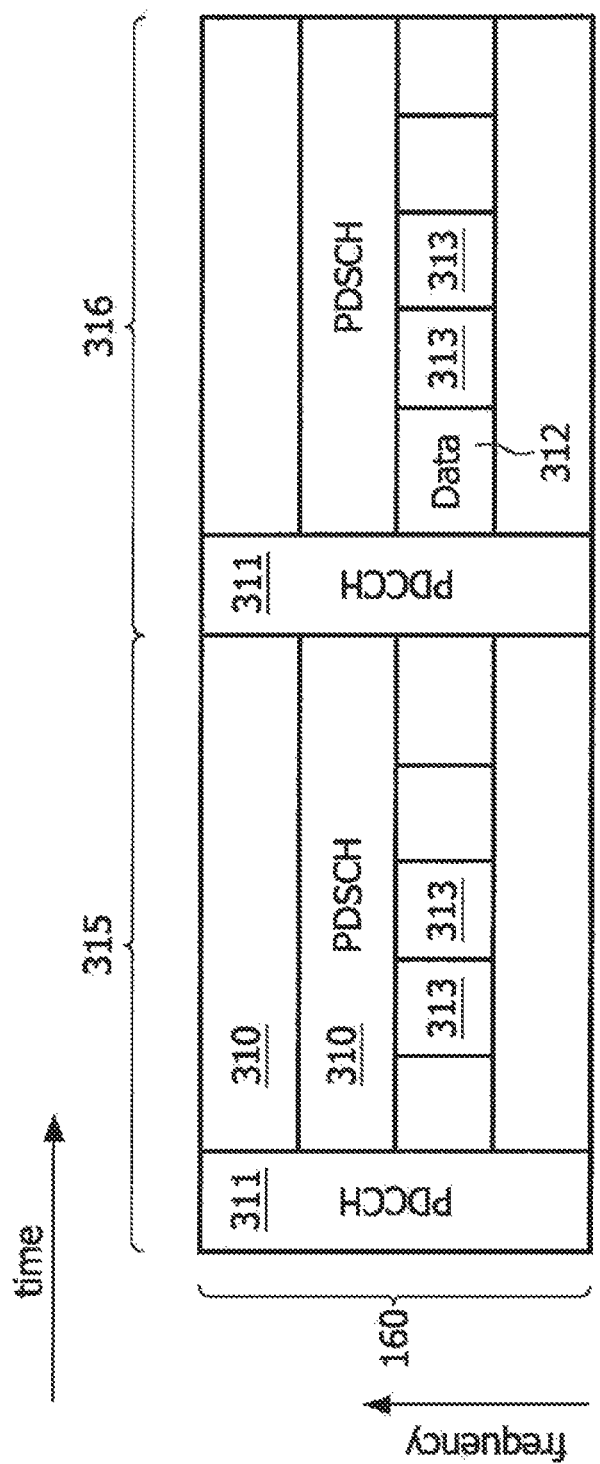

The present invention will now be described in more detail, by way of example, with reference to the accompanying drawings, wherein:

FIG. 1, already described, is a time chart representing the conventional transmitting of data;

FIG. 2 is a block diagram representing a network comprising a primary station and a secondary station in accordance with the invention; and FIG. 3 is a time chart representing the transmitting of data in accordance with an embodiment of the invention.

The present invention relates to a system of communication 300 as depicted in FIG. 2, comprising a primary station 100, like a base station or an evolved Node B (eNodeB), and at least one secondary station 200 like a mobile station or a User Equipment (also denoted UE).

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first set of channels 160 and transmission from the secondary radio station 200 to the first radio station 100 takes place on a second set of channels 260.

When the primary station 100 needs to send data to the secondary station 200, it uses one channel of the set of downlink channels 160, like a PDSCH for example. The subframe corresponding to the invention can be illustrated on FIG. 3, where the PDSCHs 310 are distributed among a plurality of frequency subcarriers. If a data is to be transmitted to a secondary station 200, the primary station 100 signals it to the secondary station 200 on a control channel (or signaling channel). In this example, the control channel is a PDCCH 311, sent on the same subcarriers as the PDSCHs 310, at the beginning of each subframe, just before the transmission of the PDSCHs 310. However, the control channel can be sent on different frequency subcarriers from those used for the corresponding data.

In accordance with an embodiment of the invention, the primary station 100 allocates the data slots 313 of the PDSCHs 310 to the secondary stations 200 in dependence upon the current state of each considered secondary station. Then, the time between the signaling and the transmission of the data message for a considered secondary station depends on the activity and the state of the secondary station. For instance, if a considered secondary station is in a continuous reception state or a connected mode, for potentially receiving data in every subframe, or at least very often, then the timing of the data relative to the signaling is of low importance. It is possible in this case to allocate a data slot 312 in the same subframe 315 in which the allocation has been signaled, and even in the first data slots of the subframe 315. By doing so, the time elapsed between the signaling and the data transmission may equal zero. This is advantageous since the last data slots can be kept for secondary stations 200 in another state.

Indeed, if the secondary stations 200 are in an idle state, or at least in a discontinuous reception state, these stations switch their receivers on only from time to time, in order to reduce the power consumption. In such a case, if data is allocated in data slots 313 just after the signalling of the allocation, these stations have to buffer all the PDSCHs while decoding the signalling message. This leads to useless power consumption, and the advantage of discontinuous reception is then reduced.

That is the reason why in an embodiment of the invention, time of transmission of the data message relative to the time of the signaling is greater for data allocated to secondary stations in a discontinuous reception (DRX) state.

In a first example of the invention, the allocated data slot 312 is chosen such that there is a delay between the signaling of the allocation 311 and the data slot 312 if the secondary station is in a DRX state. This delay can be chosen such that the time slot is in the same subframe as the signaling of the allocation, and such that the secondary station has sufficient time to decode the whole signaling frame. Thus, the receiver of the secondary station in a DRX mode is switched on only during the PDCCH 311, then off, until the allocated data slot 312. This would leave a gap of a few symbols between the end of the PDCCH and the start of the data during which time the secondary station could save power by switching off its receiver.

In a second example of the invention, the delay for secondary stations 200 in DRX state is chosen to be one or more subframes. It means that the primary station 100 signals to the secondary station 200 in the PDCCH 311 of the subframe 315 that data will be transmitted in a data slot 312 of the following subframe 316. One subframe could be set as the smallest allowed interval between the subframe in which the signaling occurs and the subframe in which the allocated data slot is located for the corresponding data transmission for a secondary station being in discontinuous reception or idle state.

For example, a secondary station in a "data reception" state could have a zero-length delay configured between the PDCCH and PDSCH (i.e. operating according to FIG. 1), while a secondary station in a "discontinuous reception" state could have a delay of 1 subframe configured, as shown in FIG. 3. The secondary station would then switch off its receiver at the end of the PDCCH transmission, and only switch it on for the PDSCH in the next subframe if the decoded PDCCH in the first subframe indicated that the PDSCH in the next subframe would contain some data for it.

In this example, the number of subframes separating the signaling from the data slot is 1, but it could be more, for instance 2, 3 . . . N subframes. This can be advantageous for instance in the case of a secondary station being in a periodic discontinuous reception mode, i.e. the secondary station switches on and off only every P subframes. Thus, the allocated data slot could be transmitted N subframes after the signaling, where N is a multiple of P. It means that the delay could take any value k·P, where k is an integer greater than 1. Then the signaling would be received during one occasion when the secondary station switches on its receiver according to the discontinuous reception cycle, and the corresponding data would be received during a later such occasion. During the later such occasion, the secondary station would already know for how long it needed to keep its receiver switched on, as a result of decoding the PDCCH on the earlier occasion.

In another embodiment, the discontinuous reception state could be an idle state in which the mobile terminal may receive paging messages from the network but not significant data messages. The paging messages would be indicated by the control channel 311 and transmitted on a PDSCH 310 in a later subframe. On switching from the idle state to a connected state, the delay would be reduced to zero. Thus in this embodiment, paging messages would be transmitted after a delay after the corresponding PDCCH signaling, while data messages would be transmitted immediately after the corresponding PDCCH signaling. The transition between the idle state and the connected state could be characterized by an exchange of signaling information indicating to the network the cell-level location of the mobile terminal, and/or the creation of a Radio Resource Control (RRC) context for the secondary station in a network entity.

In a variant of the invention, the delay is predetermined and known a priori by both primary and secondary stations.

In another variant of the invention, the delay is determined by the primary station or other network entity and signaled to the secondary stations by the primary stations for instance on a broadcast channel or similar.

In another variant of the invention, the delay between notification of transmission on PDCCH and transmission of data is configured by higher layers (e.g. RRC) signaling. As the process of switching states by RRC signaling can be slow, it may be advantageous for the system to be able to operate even with continuous packet transmission while the increased delay is in operation between PDCCH and PDSCH; in such a case, the maximum number of retransmission processes (like HARQ processes) needed will, in general, increase with the length of the delay, and this would increase the total buffer size needed in the secondary station. Indeed, if the delay is longer, the number of parallel retransmission processes will increase, and the size of the buffer increases then. To avoid adverse impact on the secondary station implementation arising from an increase in total buffer size, the buffer size for each process could be reduced if the number of retransmission processes was increased. This means that the code rate may be reduced for these secondary stations, if the number of parallel retransmission processes is increased, so that the buffers of the secondary stations are not overfilled. This also means that the message size can be reduced to prevent the increase of the required buffer size due to parallel retransmission processes.

In another variant of the invention, the delay between notification of the transmission on PDCCH and the transmission of data is configured to so as to minimize any potential wastages of subframes which are left as gaps between the signaling and the data slot. For example, if the full signaling capacity in one subframe is used to indicate a data transmission in a later slot, for example after a delay of 1 subframe, then there is one sub frame which cannot be used for data transmissions to secondary stations for which the delay is not configured. If there is a shortage of signaling capacity, in for example a low bandwidth cell, then this could restrict the total number of secondary stations which can receive data transmissions. In embodiments where the invention is used for reception of paging messages, this restriction may lead to reduced performance of the paging mechanism. One way to avoid the waste of a subframe in this example would be to divide the secondary stations into two or more sets which would use different sets of slots for the signaling of the allocation. One possible allocation of different sets could be that one set of secondary stations receives the signaling of the allocation in odd-numbered subframes and the other set in even-numbered subframes. The assignment of the secondary stations to either set can be made by higher layer control signaling defined when the secondary station is configured or by some existing property of the UE thus not requiring any control signaling. For example all the secondary stations will have an assigned unique identity and a rule could be defined so that a pre-defined set of known identities are always defined to use odd or even numbered subframes for the signaling of the allocation. For example, secondary stations with an odd-numbered identity could receive the signaling of the allocation in odd-numbered subframes.

It is to be noted that the present invention is not limited to mobile communication systems such as the LTE of UMTS, but it is possibly also applicable to other standards such as evolutions of WiMAX or cdma2000.

Indeed, the present invention is not limited to mobile telecommunications systems described herein as an example, but could be extended to any other communication systems.

In the present specification and claims the word "a" or "an" preceding an element does not exclude the presence of a plurality of such elements. Further, the word "comprising" does not exclude the presence of other elements or steps than those listed.

The invention has been largely described in relation to signalling and data transmissions made by a network entity to a mobile terminal, but it will be understood that the invention applies equally to opposite or other allocations of roles to nodes.

From reading the present disclosure, other modifications will be apparent to persons skilled in the art. Such modifications may involve other features, which are already known in the art of radio communication and the art of transmitter power control and which may be used instead of or in addition to features already described herein.

The invention claimed is:

1. A method for operating a primary station for transmitting data to a secondary station of a plurality of secondary stations, comprising acts of:
   in a primary station;
      determining by a processor a state of a secondary station;
      signaling by the processor via a transmitter to the secondary station by a signaling message that a data message is to be transmitted from the primary station to the secondary station;
      transmitting by the processor via a transmitter the data message to the secondary station; and
      logically dividing the plurality of secondary stations into a first set of secondary stations and a second set of secondary stations, the first set of secondary stations receiving the signaling message in one of an odd-numbered subframes and an even-numbered subframes and the second set of receiving the signaling message in another of the odd-numbered subframes and the even-numbered subframes,
      wherein a time of data transmission of the data message relative to a time of the signaling message depends on a state of the secondary station.

2. The method of claim 1, wherein the state of the secondary station is one of: a continuous reception, a discontinuous reception, a connected mode, an idle mode, and a paging mode.

3. The method of claim 1, wherein the transmitting act starts immediately after end of the signaling act if the state of the secondary station is a continuous reception state or a connected mode state.

4. The method of claim 1, wherein the time of data transmission of the data message is such that there is a delay between an end of the signaling message and a start of the data transmission if the secondary station is in a discontinuous reception state or an idle mode state or a paging mode state.

5. The method of claim 4, wherein the delay is a portion of a subframe if the secondary station is in the discontinuous reception state, said portion of a subframe comprising an amount of time greater than or equal to an amount of time allowed for the secondary station to decode the signaling message.

6. The method of claim 4, wherein the delay is indicated to the secondary station by the primary station before the signaling act.

7. The method of claim 4, wherein a retransmission protocol with multiple processes is used for the data transmission, said retransmission protocol being characterized in that a number of the multiple processes is larger when there is a delay between the signaling act and the transmitting act than when the data message is transmitted immediately after the signaling message.

8. The method of claim 7, wherein a maximum data message size is reduced when the number of the multiple processes is larger.

9. The method of claim 1, wherein there is a delay between a subframe in which the signaling act occurs and a subframe in which the transmitting act occurs, wherein the delay equals N subframes, where N is an integer, which equals at least 1, and wherein a subframe is a smallest allowed interval between two signaling acts.

10. The method of claim 1, wherein the discontinuous reception state is periodic with a period P between subframes in which the secondary station is expected to receive data, and wherein N is an integer multiple of P.

11. The method of claim 1, wherein the time of data transmission of the data message relative to the time of the signaling message is chosen so as to reduce a quantity of non-used data subframes.

12. The primary station of claim 1, wherein in at least one of a continuous reception state and a connected state of the secondary station, a time elapsed between the signaling act and the transmitting act is zero.

13. A primary station for transmitting data to a secondary station of a plurality of secondary stations, comprising:
   a processor to determine a state or activity of the secondary station;
   a transmitter controlled by the processor to transmit to the secondary station, in one of the odd-numbered subframes and the even numbered subframes, a signaling message indicating that a data message is to be transmitted by the primary station to the secondary station;
   the processor to logically divide the plurality of secondary stations into a first set of secondary stations and a second set of secondary stations, the first set of secondary stations receiving the signaling message in one of an odd-numbered subframes and an even-numbered subframes and the second set of receiving the signaling message in another of the odd-numbered subframes and the even-numbered subframes,
   wherein the transmitter is controlled by the processor to transmit the data message to the secondary station after transmitting the signaling message; and
   wherein a time delay between the transmission of the signaling message and the transmission of the data message depends on the determined state or activity of the secondary station.

14. The primary station of claim 13, wherein the state of the secondary station is one of: a continuous reception, a discontinuous reception, a connected mode, an idle mode, and a paging mode.

15. The primary station of claim 13, wherein the transmitting act starts immediately after end of the signaling act if the state of the secondary station is a continuous reception state or a connected mode state.

16. The primary station of claim 13, wherein the time of data transmission of the data message is such that there is a delay between an end of the signaling message and a start of the data transmission if the secondary station is in a discontinuous reception state or an idle mode state or a paging mode state.

17. The primary station of claim 16, wherein there is a delay between a subframe in which the signaling act occurs and a subframe in which the transmitting act occurs, wherein the delay equals N subframes, where N is an integer, which equals at least 1, and wherein a subframe is a smallest allowed interval between two signaling acts.

18. The primary station of claim 17, wherein the discontinuous reception state is periodic with a period P between subframes in which the secondary station is expected to receive data, and wherein N is an integer multiple of P.

19. The primary station of claim 16, wherein the delay is a portion of a subframe if the secondary station is in the discontinuous reception state, said portion of a subframe comprising an amount of time greater than or equal to an amount of time allowed for the secondary station to decode the signaling message.

20. The primary station of claim 16, wherein the delay is indicated to the secondary station by the primary station before the signaling act.

21. The primary station of claim 16, wherein a retransmission protocol with multiple processes is used for the data transmission, said retransmission protocol being characterized in that a number of the multiple processes is larger when there is a delay between the signaling act and the transmitting act than when the data message is transmitted immediately after the signaling message.

22. The primary station of claim 21, wherein a maximum data message size is reduced when the number of the multiple processes is larger.

23. The primary station of claim 13, wherein the time of data transmission of the data message relative to the time of the signaling message is chosen so as to reduce a quantity of non-used data subframes.

24. The primary station of claim 13, wherein in at least one of a continuous reception state and a connected state of the secondary station, a time elapsed between the signaling act and the transmitting act is zero.

25. A secondary station for receiving data messages from a primary station, comprising:
   a processor controlling a reception state of the secondary station;
   a transmitter of the secondary station controlled by the processor for transmitting a status message to the primary station indicating the state of the secondary station when the reception state of the secondary station changes;
   a receiver of the secondary station controlled by the processor to operate in the reception state, the receiver being configured to receive a signaling message in one of an odd-numbered subframes and an even numbered subframes indicating that a data message is to be transmitted by the primary station to the secondary station,
   wherein the receiver is controlled by the processor to receive the data message from the primary station after receiving the signaling message;
   wherein a time delay between the reception of the signaling message and the reception of the data message depends on the state or activity of the secondary station in the status message transmitted to the primary station.

26. The secondary station of claim 25, wherein in the at least one of the continuous reception state and the connected state of the secondary station, a time elapsed between the signaling act and the transmitting act is zero.

27. The secondary station of claim 25, wherein in at least one of a discontinuous reception state, an idle state, and a paging state of the secondary station, a time elapsed between the signaling act and the transmitting act is greater than a time elapsed between the signaling act and the transmitting act in the at least one of the continuous reception state and the connected state.

28. The secondary station of claim 25, wherein in at least one of a discontinuous reception state, an idle state, and a paging state of the secondary station, the first subframe is same as the second subframe and a delay is provided between an end of the signaling act and a start of the transmitting act.

29. The secondary station of claim 28, wherein the delay is predetermined and known a priori by the primary stations and the secondary station.

30. The secondary station of claim 25, wherein in at least one of a discontinuous reception state, an idle state, and a paging state of the secondary station, the first subframe is before the second subframe.

31. The secondary station of claim 25, wherein the signaling act allocates a time slot for a transmission of the data message to the secondary station, and wherein in a discontinuous reception state of the secondary station, a receiver of the secondary station is switch off between end of the signaling act and a beginning of the allocated data slot.

32. The secondary station of claim 25, further comprising an act of dividing the plurality of secondary stations into a first set of secondary stations having a first unique identity and a second set of secondary stations having a second unique identity, the first set of secondary stations receiving the signaling message in one of an odd-numbered subframes and an even-numbered subframe and the second set of receiving the signaling message in another of the odd-numbered subframes and the even-numbered subframes.

33. A computer-readable storage-medium that is not a transitory propagating signal or wave, the medium comprising control information for a method of operating a primary station for communication with a secondary station of a plurality of secondary stations, the method comprising:

in a primary station:

determining by a processor a state of a secondary station;

signaling by the processor via a transmitter to the secondary station by a signaling message that a data message is to be transmitted from the primary station to the secondary station;

transmitting by the processor via a transmitter the data message to the secondary station; and logically dividing the plurality of secondary stations into a first set of secondary stations and a second set of secondary stations, the first set of secondary stations receiving the signaling message in one of an odd-numbered subframes and an even-numbered subframe and the second set of receiving the signaling message in another of the odd-numbered subframes and the even-numbered subframes, wherein a time of data transmission of the data message relative to a time of the signaling message depends on a state of the secondary station.

34. A computer-readable storage-medium that is not a transitory propagating signal or wave, the medium comprising control information for a method of operating a secondary station for receiving data from a primary station in a network comprising a plurality of secondary stations, comprising acts of:

in a secondary station:

a processor controlling a reception state of the secondary station;

a transmitter of the secondary station controlled by the processor for transmitting a status message to the primary station indicating the state of the secondary station when the reception state of the secondary station changes;

a receiver of the secondary station controlled by the processor to operate in the reception state, the receiver being configured to have one of a first unique identity or a second unique identity, the receiver receiving the signaling message in one of an odd-numbered subframes and an even-numbered subframe when it is configured to have the first identity and the receiver receiving the signaling message in another of the odd-numbered subframes and the even-numbered subframes when it is configured to have the second identity.

* * * * *